United States Patent [19]

Hills et al.

[11] 3,870,577

[45] Mar. 11, 1975

[54] PROCESS FOR MAKING WHISKER-LIKE CRYSTALS OF AMMONIUM PERCHLORATE

[75] Inventors: Marian E. Hills, China Lake; William M. Ayres, Ridgecrest, both of Calif.

[73] Assignee: The United States of America as represented by the Secretary of the Navy, Washington, D.C.

[22] Filed: Oct. 9, 1970

[21] Appl. No.: 79,680

[52] U.S. Cl. ........................ 149/2, 23/295, 23/302, 149/76, 149/113, 423/476
[51] Int. Cl. ............................................. C06b 11/00
[58] Field of Search ......... 23/85, 295, 302; 148/1.6; 149/2, 76, 113; 423/476

[56] References Cited
UNITED STATES PATENTS

| | | | |
|---|---|---|---|
| 3,106,497 | 10/1963 | Weil | 149/17 |
| 3,147,085 | 9/1964 | Gatti | 148/1.6 X |
| 3,172,793 | 3/1965 | Markowitz | 149/19 |

*Primary Examiner*—Leland A. Sebastian
*Assistant Examiner*—E. A. Miller
*Attorney, Agent, or Firm*—R. S. Sciascia; Roy Miller; Lloyd E. K. Pohl

[57] ABSTRACT

A process for producing whisker-like crystals of micron and submicron size of ammonium perchlorate which comprises feeding a solution of ammonium perchlorate through a silicone-coated porous glass tube. These crystals are used as an ingredient in explosives, pyrotechnic compositions and propellant compositions for solid fuel rockets.

4 Claims, No Drawings

PROCESS FOR MAKING WHISKER-LIKE CRYSTALS OF AMMONIUM PERCHLORATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a process for producing whisker-like crystals of micron and submicron size of ammonium perchlorate.

Ammonium perchlorate is used as an ingredient in explosives, in pyrotechnic compositions, as a raw material for the production of perchloric acid and numerous metallic perchlorates. The predominant use of ammonium perchlorate is as an ingredient in propellant compositions for solid fuel rockets. For this use it is necessary that the ammonium perchlorate meet fairly rigid requirements for chemical purity and physical properties. The present process produces ammonium perchlorate whisker-like crystals having both improved chemical and physical properties which make the product particularly useful in solid propellant formulation.

BRIEF DESCRIPTION OF THE INVENTION

In accordance with the present invention a predetermined amount of commercial grade ammonium perchlorate crystals was mixed with water to form a solution. A porous glass tube which had been stored in a humidity box overnight was carefully wetted inside and out and checked for leaks, then wiped with a clean tissue or towel. A coating consisting of a thin film of silicone adhesive was uniformly spread by rubbing over the outside surface of the dry tube. The coated surface was then polished. The tube, thus prepared, was placed beneath a vessel containing the ammonium perchlorate solution which was metered into the tube. The temperature surrounding the tube and vessel ranged from about 20° to 30° C. As the solution enters the tube diffusion through the porous walls takes place whereby crystals of micron and submicron size having a length to diameter ratio of between 10:1 and 100:1 are formed. The crystals are whisker-like and more particularly, crystals without inclusions. The crystals continue to grow as long as they are fed the ammonium perchlorate solution. They appear white in color and can be stored under ambient conditions without loss of optimum ballistic performance. In contrast, ground ammonium perchlorate crystals require immediate use after grinding as they tend to agglomerate with time and aging. Ammonium perchlorate whiskers grown by this process have a diameter reduced by a factor of about 50 as compared to whiskers grown in porous tubes without the silicone adhesive coating which is critical to the success of this invention.

The silicone adhesive used herein is sold under the tradename "732 RTV (Silastic)" which is a product of Dow Corning Corporation of Midland, Michigan. The silastic adhesive comprises dimethyl siloxane, silicon dioxide, ferric oxide and mercuric oxide (½ - 1 percent). Other similar silicone adhesives may be used.

The following nonlimiting example illustrates a preferred method of practicing the present invention.

One hundred-sixty five (165) grams of ammonium perchlorate were dissolved in one liter of water to form an ammonium perchlorate solution. A porous glass tube, available commercially, was checked for leaks, wiped clean, coated on the outside by rubbing on a thin film of "Silastic 732 RTV," and polished. The tube was then positioned beneath a vessel containing the ammonium perchlorate solution which was metered into the tube. Diffusion through the porous walls occurred whereby whisker-like crystals of ammonium perchlorate formed and hung to the outside of the tube. The whiskers were removed by scraping with a spatula. Removal may be accomplished by vacuum, or other suitable means. The process takes place under ambient conditions.

By the same process co-crystallization of certain burning rate modifiers with ammonium perchlorate was also attained. The following are examples of ingredients used per liter of water:

A. 1.65 g potassium perchlorate 163.35 g ammonium perchlorate

B. 8.25 g potassium perchlorate 156.75 g ammonium perchlorate

C. 11.79 g potassium perchlorate 153.21 g ammonium perchlorate

D. 1.9 g ammonium permanganate 163.1 g ammonium perchlorate

E. 4.0 g ammonium dichromate 161.0 g ammonium perchlorate

The modifiers used must have ions which can be incorporated into the ammonium perchlorate crystals. Other such modifiers may be successfully incorporated.

What is claimed is:

1. A process for producing whisker-like crystals of ammonium perchlorate which comprises the following steps:
   a. providing a quantity of a solution of ammonium perchlorate;
   b. providing a porous glass tube;
   c. rubbing a thin, uniform film of silicone adhesive onto the outside walls of said tube; and
   d. feeding said solution into said tube under ambient conditions;

whereby diffusion of said solution through said walls produces whisker-like crystals which grow so long as said solution diffuses through the walls of said tube.

2. The process in accordance with claim 1 wherein said solution also contains a burning rate modifier selected from the group consisting of potassium perchlorate, ammonium permanganate and ammonium dichromate.

3. Whisker-like crystals of ammonium perchlorate having a length to diameter ratio of between 10:1 and 100:1.

4. The crystals in accordance with claim 3 which consist essentially of ammonium perchlorate and a burning rate modifier selected from the group consisting of potassium perchlorate, ammonium permanganate and ammonium dichromate.

* * * * *